E. F. GALLAUDET.
ART OF LIQUEFYING GAS AND SEPARATING ITS ELEMENTS.
APPLICATION FILED JAN. 21, 1909.

981,755.

Patented Jan. 17, 1911.

Attest:
E. S. Mitchell
William Vogan.

Inventor:
Edson F. Gallaudet
by Wm B. Whitney
his Atty

E. F. GALLAUDET.
ART OF LIQUEFYING GAS AND SEPARATING ITS ELEMENTS.
APPLICATION FILED JAN. 21, 1909.

981,755.

Patented Jan. 17, 1911.

E. F. GALLAUDET.
ART OF LIQUEFYING GAS AND SEPARATING ITS ELEMENTS.
APPLICATION FILED JAN. 21, 1909.

981,755.

Patented Jan. 17, 1911.

Attest:

Inventor:
Edwin F. Gallaudet by his Atty

UNITED STATES PATENT OFFICE.

EDSON F. GALLAUDET, OF NORWICH, CONNECTICUT, ASSIGNOR, BY MESNE ASSIGNMENTS, TO GENERAL AIR PRODUCTS COMPANY, OF NEW YORK, N. Y., A CORPORATION OF DELAWARE.

ART OF LIQUEFYING GAS AND SEPARATING ITS ELEMENTS.

981,755.   Specification of Letters Patent.   Patented Jan. 17, 1911.

Application filed January 21, 1909. Serial No. 473,444.

*To all whom it may concern:*

Be it known that I, EDSON F. GALLAUDET, a citizen of the United States, and resident of the city of Norwich, in the county of New London and State of Connecticut, have invented certain new and useful Improvements in the Art of Liquefying Gas and Separating its Elements, of which the following is a specification.

My invention relates to the liquefaction of gases, either pure or mixed, and to the treatment of liquefied mixed gases to separate them into their component parts; and more particularly to the production of practically pure oxygen and nitrogen by the liquefaction and separation of air.

Practically pure oxygen is at present obtained commercially, through the liquefaction and subsequent distillation of air, by means of (1) distilling apparatus wherein by thermal interchange compressed air is liquefied and a liquid (air, initially) is vaporized and the vapor thus produced passes upwardly through a downwardly flowing current of the newly liquefied air and (2) a counter current interchanger wherein the incoming current of compressed air to be liquefied and separated is cooled by an outgoing current of the evaporation products of the distilling apparatus; and liquid air is provided, to supply an initial charge for and replace subsequent losses in the distilling apparatus, by means of (3) an expander, either a throttled nozzle or reciprocating or turbine motor, wherein air is expanded and thereby cooled, (4) a counter current interchanger wherein the compressed air supplied to the expander is progressively cooled down to the required degree by the cooler air from the expander, and, preferably, (5) a liquefier wherein compressed air from the interchanger is liquefied by the cold air from the expander before the same is passed into the interchanger.

The object of my invention is, primarily, to simplify, improve, and increase the efficiency of the means (both process and apparatus) employed for and thereby to lower the cost of the production of commercially pure oxygen and nitrogen from the air.

To this end the invention consists, broadly stated, in employing the cold exhaust air from an expander to first liquefy sufficient compressed air to provide an initial or preliminary change of liquid air and then, in coöperation or interaction with this preliminary change and with air subsequently liquefied under compression by the vapor products of the distillation and released from pressure in a continuous flow, to separate the oxygen and nitrogen both of the liquid and of the exhaust itself, thus enabling me, after the operation is once under way, to raise the temperature of the compressed air supplied to the expander and to obtain more actual refrigerative effect from the adiabatic expansion of the air than can be obtained in any other way and without interfering with the maintenance of the low temperature required to supply and keep up the flow of the liquid air.

It also consists in the construction arrangement, and combination of parts which constitute the apparatus for carrying into effect my new process, which apparatus comprises an interchanger, liquefier, expander, and separator or distiller, the latter being sub-divided into parts which I have designated as a purifier, rectifier, and vaporizer.

One form of apparatus embodying my invention and suitable for carrying into effect the process specified above is illustrated in the accompanying drawings, in which—

The same reference character indicates the same part in the several figures.

Figure 1:
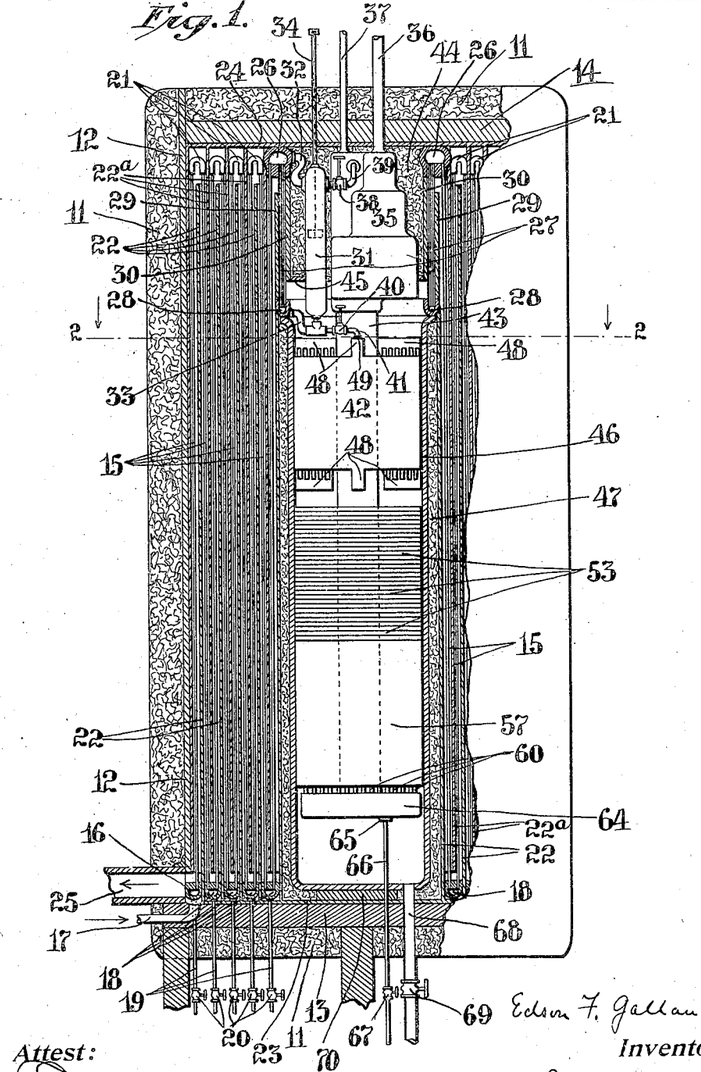
Figure 1, is a vertical section, partly broken away, showing the general arrangement of the whole apparatus.
Figure 2:
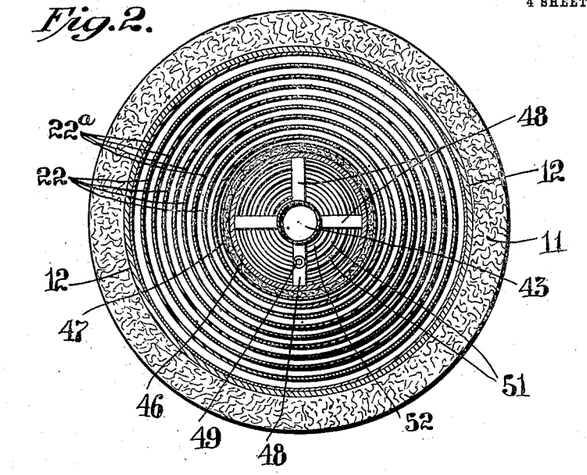
Fig. 2, a horizontal section at the line 2 2 of Fig. 1.

Referring to the drawings, the entire apparatus is incased in a heavy insulating covering 11, which is wrapped around a wooden casing 12, which in turn is closed at bottom and top by timber heads 13 and 14. The bottom head 13 is provided with wooden legs, and serves as the foundation support for the whole apparatus. Inside the wooden casing 12 are a number of concentric insulating baffle shells 22 and 22ª which alternate with each other, the former being closed and supported at the bottom by the insulating cover plate 23, and the latter closed and supported at the top by the insulating cover plate 24, thus forming a continuous annular passage down under and up over the alternate baffle shells. Inside the baffle shells are placed the interchanger tubes 15, arranged in concentric circular rows, a single row occupying the middle of the annular space between adjacent baffles. The outermost row of tubes are connected, at the bottom, to a hollow circular manifold 16, and, at the top, are connected by a series of U-bends 21 each to the corresponding tube in the second row. The second and third rows of tubes are connected at the bottom to the first and the fourth and fifth rows to the second of several circular manifolds 18, and so on through all the successive rows of tubes; while, at the top, the third and fourth and the fourth and fifth rows of tubes are connected together by U-bends in the same manner as the first and second rows already described, and so on to the innermost row which, also at the top, is connected to the top manifold of the liquefier 26. It will thus be seen, that if compressed air is brought into the bottom outermost manifold 16, through the pipe 17, this compressed air will pass up through the first row of tubes 15, down through the second row of tubes, and so on, up and down, until it passes up through the innermost row of tubes into the liquefier manifold 26. Also, if expanded gas is discharged from inside the apparatus into the inner end of the annular passage formed by the baffles it will pass down and up through the same, always surrounding the tubes and moving in a direction opposite to the direction of flow of the compressed air therein, until it finally leaves the apparatus by the discharge channel 25. The bottom manifolds 16 and 18 are provided with drain pipes 19 and drain valves 20, so that, if frost should accumulate inside the tubes 15 or the manifolds 16 and 18, it may be melted out and drained off through the pipes 19 and the valves 20. The parts described up to this point from the interchanger, inside of which are placed all the other vital parts of the apparatus. The innermost row of tubes of the interchanger is connected, at the top, to the top manifold of the liquefier, as already stated.

Figure 3:
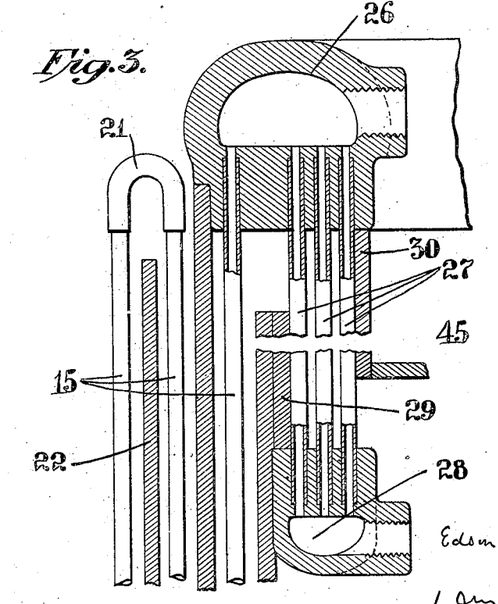
Fig. 3, an enlarged detail showing in vertical section the construction of the liquefier.

The liquefier comprises the top manifold 26, the bottom manifold 28, and the circular multiple bank of tubes 27 connecting the manifolds 26 and 28 together and uniting with them to form a single vessel of large external surface. The top manifold 26 is connected by a pipe 32, through a trap 31, a throttle valve 38, and a pipe 39, to the high pressure valve chest of the motor 35, which exhausts into the lower part of the apparatus through a pipe 43. The bottom manifold 28 is connected by a pipe 33, open to the bottom of the trap 31, with a discharge valve 40 and a pipe 41 through which the liquid may be discharged into the lower part of the apparatus.

The work done by the expansion in the motor 35 is carried off outside the apparatus by a piston rod working in a piston rod sleeve 36, and the distribution of air or gas, necessary to produce proper expansion in the motor, is controlled by valves actuated by a valve stem passing out through the valve stem sleeve 37.

The bank of tubes 27 of the liquefier is surrounded outside by an insulating baffle sleeve 29, which rests on the bottom manifold 28 but leaves a small space between itself and the top manifold 26. The bank of liquefier tubes is protected on the inside by an insulating baffle sleeve 30, which is held up against the top manifold 26 but leaves a small space between itself and the bottom manifold 28. The lower end of the baffle sleeve 30 is closed by an insulating retaining plate 45, and all the space inside the sleeve 30, and above the plate 45, is filled with insulating material 44, packed in around the motor 35, trap 31, and connected parts. It is evident that gas exhausted from the motor 35 into the interior of the apparatus, must pass out between the baffle sleeves 29 and 30, moving along and upward around the tubes 27 of the liquefier, over the top edge of the baffle 29, and so down into the outgoing channel of the interchanger.

The apparatus described up to this point includes the interchanger, by which the low temperatures are intensified, the expansion motor, by which the refrigeration is produced, and the liquefier, by which the refrigeration is used to transform some of the incoming compressed air into liquid. These parts comprise many novel features of construction, but their principles of operation are already well known.

I will now describe the parts introducing the fundamental features of this invention.

The liquefier rests on and is supported by the top edge of a well 46, which occupies the central portion of the apparatus below the liquefier, and contains the purifier 42, the rectifier 53, and the evaporator 57. This well 46 is supported on a wooden block 70, and is surrounded by insulating material 47. The liquefier is provided with a trap 31, which is connected at its top to the manifold 26, by a pipe 32, and is connected at its bottom to the manifold 28, by a pipe 33. This trap 31 is provided at its top with a glass tell-tale tube 34, closed at its upper end and projecting out above the main body of the apparatus; within which tube a light rod sliding freely up and down and mounted upon a float within the trap (a well known indicator device shown only in dotted line) enables the operator to determine from without the level of the liquid in the liquefier.

Figure 4:
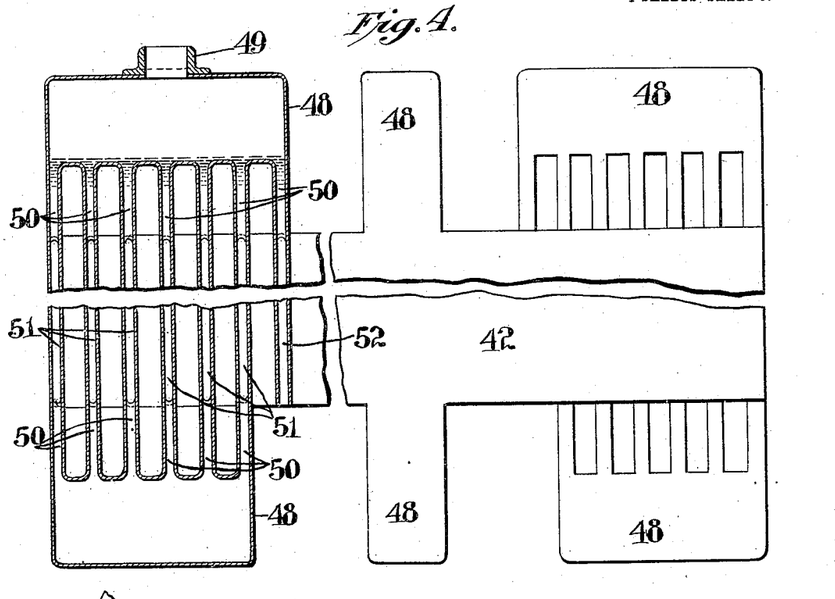
Fig. 4, an enlarged detail, partly in vertical section and partly an elevation showing the construction of the purifier.
Figure 5:
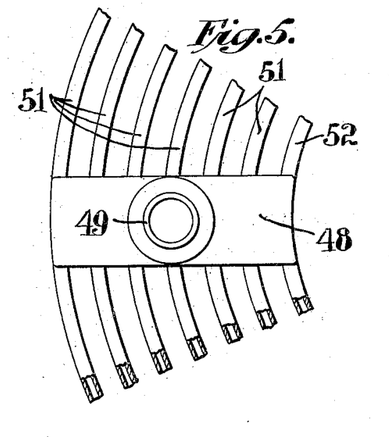
Fig. 5, an enlarged broken plan of the purifier, partially cut away.

The liquid formed in the liquefier is drained off through the valve 40 and pipe 41 and is discharged into the purifier 42. The purifier 42 is made up of a large number of thin concentric annular tanks 51, which, spaced a slight distance apart so as to leave narrow annular passages between them, are connected together at intervals to form a single tank by short hollow connecting extensions 50 opening into the top and bottom cross connecting boxes 48. The innermost annular tank 52 fits closely around the motor exhaust pipe 43 and is open at its bottom, not being connected to the bottom cross boxes 48. The liquefier discharge pipe 41 is connected by a boss 49 to one of the top cross boxes 48. When liquid is discharged from the liquefier, through the valve 40 and pipe 41, it will fill all parts of the purifier 42, rising in the same until its level reaches the top ends of the top extensions 50, whereupon it will begin to run over through the top cross boxes and down through the innermost annular tank 52 and will be discharged, together with any vapor it may be giving off, into the top of the rectifier immediately below.

Figures 6, 7:
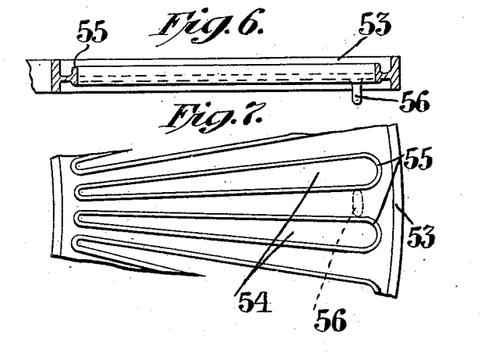
Figs. 6 and 7, enlarged details showing in broken plan and vertical section respectively, the construction of a single element of the rectifier.
Figure 8:
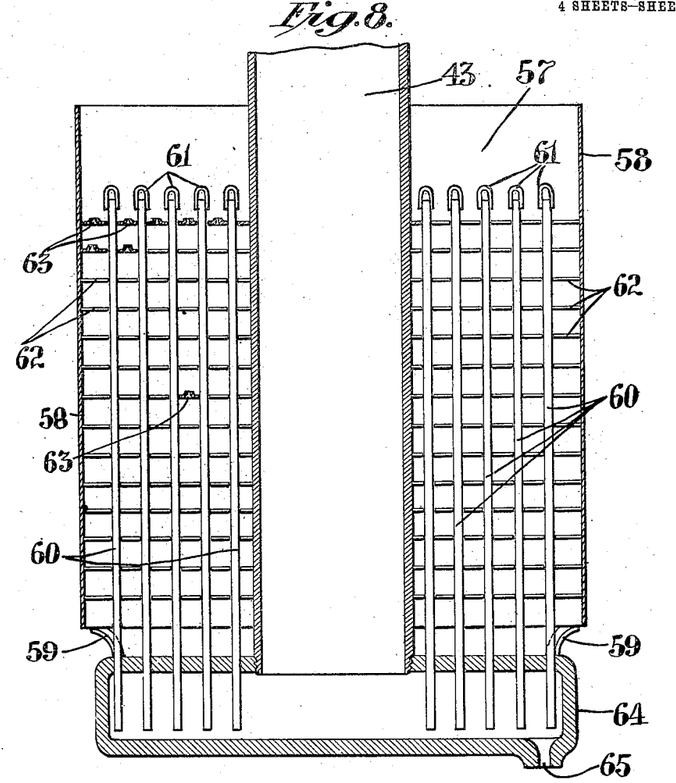
Fig. 8, an enlarged vertical section showing the construction of the evaporator.

The rectifier consists or is made up of a number of flat horizontal pans 53 placed one above the other and a short distance apart, each pan being provided with a number of radial openings 54, surrounded by raised lips 55, and with a single lug 56 so placed that it will enter an opening in the pan next below and thus assure the staggering of the openings of adjacent pans. It is evident that the liquid, falling from the purifier into the rectifier, will first fill the top pan to the edge of its lips and will then run over and through the openings therein into the pan below, which will be filled in turn, and so on successively to the bottom of the rectifier, trickling down through the zig-zag path formed by the staggered openings 54. As it leaves the rectifier, the liquid falls into the evaporator 57. This part of the apparatus consists of a cylindrical casing 58, containing a number of horizontal baffle plates 62 which are perforated to allow the loose insertion of vertical tubes 60. These tubes are fastened at their lower ends in the top wall of and open into a hollow flattened circular box 64 into which opens the lower end of the motor exhaust pipe 43, and which also is fastened to the casing 58 by the supports 59. The box 64 is provided with a drain boss 65 in its bottom, to which is attached a drain pipe 66 and drain valve 67, so that if frost should accumulate in the tubes 60, in the box 64, or in the motor exhaust pipe 43, it may be melted out and drained off through the valve 67. The baffle plates 62, in addition to the perforations which provide passages for the tubes 60, have additional perforations 63, which are punched from the lower side so as to leave a slight bur around the upper side of the openings.

Figure 9:
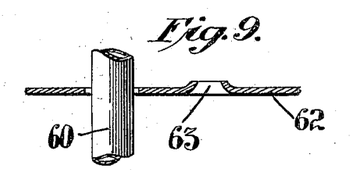
Figs. 9 and 10, details of the construction of the evaporator.
Figure 10:
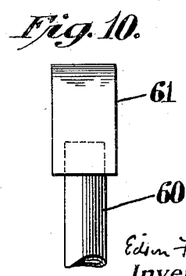

It is evident that when liquid falls into the evaporator 57, it will spread out over the baffles 62 and, instead of running through the holes 63, will be held back by the burs thereof and will trickle through the openings cut for the tubes 60 and run down on the outside surface of the tubes themselves to the top of the box 64 on which it will accumulate and over the edge of which it will finally fall into the bottom of the well 46, from which it may be drawn off by the pipe 68 and the valve 69. The tubes 60 project nearly to the bottom of the box 64, so that if for any reason liquid should form in the tubes 60 and run back into the box 64 it will on reaching the level of the lower ends of the tubes 60 be blown up through them by the motor exhaust to the top of the evaporator. The tubes 60 are also provided at their tops with caps 61, which serve to prevent the liquid from falling from the rectifier into the tubes and also prevent the exhaust, which blows up through the tubes 60, from throwing drops of liquid back into the rectifier.

It is evident from the foregoing, that the exhaust of the motor 35 passes down through the exhaust pipe 43, preferably of insulating material, into the box 64, whence it blows up through the tubes 60, through the rectifier pan openings 54, through the annular spaces between the annular tanks 51 of the purifier 42, and then passes out through the liquefier and interchanger, as already described. It is also evident from the foregoing, that liquid formed in the liquefier tubes 27 will fall into the bottom manifold 28, and may be drawn off by the pipe 33 and valve 40. The liquid thus drawn off will be discharged by the pipe 41 into the purifier 42, filling the same until it runs over into and fills each of the rectifying pans 53 in turn. When the bottom pan is filled the liquid runs over and into the evaporator 57, striking the baffles 62, running down the outside of the tubes 60, and finally running over the edge of the box 64, accumulates in the bottom of the well 46, whence it may be drawn off through the pipe 68 and the valve 69. It will be understood, of course, that the tanks of the interchanger, the tanks of the liquefier, the annular tanks of the purifier, and the baffle plates and tubes of the evaporator are all to be made of suitable heat conducting material, preferably copper, which should be as thin as possible for obvious reasons.

Having now described all the parts of the apparatus, I will explain its operation as a whole.

Compressed air, thoroughly cleaned and dried, and deprived of its carbonic acid, is forced in through the high pressure connection 17 and fills the interchanger tubes 15, the liquefier manifolds 26 and 28, the liquefier tubes 27, the liquefier trap 31, and the connecting pipes up to the throttle valve 38 and the discharge valve 40. The throttle valve 38 is then opened and the motor 35 is started. The compressed air passes into the motor, expands therein to nearly atmospheric pressure, and passes down into the box 64 at the bottom of the evaporator 57, whence it blows upward through the evaporator tubes 60, then through the rectifying pan openings 54, then on up through the annular spaces between the elements 51 of the purifier 42, then up through the space between the liquefier baffle sleeves 29 and 30 and around the liquefier tubes 27, and then passes out through the annular exhaust channel surrounding the interchanger tubes 15. Since the work of expansion of the air is carried off mechanically by the motor 35, the exhaust is much colder than the compressed air entering the throttle 38. This cold exhaust first cools the evaporator 57, then the rectifying pans 53, then the purifier 42, then the liquefier, and then begins to cool the interchanger tubes 15, and also the compressed air being brought by them to supply the motor 35. When this cooled compressed air reaches the motor 35, it will expand to a lower temperature than the warmer air which just preceded it, so that the cold exhaust is able to cool itself by cooling the compressed air which is on its way to the motor. This operation is the well known interchanging function, and will continue to reduce the temperature of the exhaust until it is cold enough to make the compressed air in the liquefier begin to condense into liquid. As the liquid forms in the liquefier it will fill the bottom manifold 28, rising to a common level in the liquefier tubes 27 and trap 31. This level will be indicated by the rise of the rod in the tell-tale tube 34, and when a proper amount of liquid has accumulated the discharge valve 40 is opened so that the liquid may run out into the purifier 42.

By proper observation of the tell-tale tube 34 the operator can keep the liquid in the liquefier at any level desired, allowing the liquid to be discharged as rapidly as it is condensed. The liquid thus discharged fills the purifier 42, then runs over and fills the rectifying pans 53, then trickles down over the outside of the evaporator tubes 60, and finally accumulates in the bottom of the well 46, whence it may be drawn off. But in its downward course from the liquefier the liquid is exposed to the action of the upward moving exhaust. It will be shown presently that the temperature of the exhaust is kept above that of the liquid, and the action between exhaust and liquid is as follows: In the evaporator 57 the liquid, deposited in a thin falling film on the outside of the tubes 60, is exposed to the higher temperature of the warmer exhaust inside the tubes, without actually coming in contact with the exhaust itself, and the result is that the nitrogen contained in the liquid is boiled away and passes up in the form of vapor through the holes 63 in the evaporator baffles 62, and mingles with the exhaust as it leaves the evaporator and enters the rectifying pans 53. The liquid that reaches the bottom of the apparatus is therefore practically pure oxygen. After leaving the evaporator 57, the exhaust and the vapor boiled off from the liquid together enter the rectifying pans 53 and pass upward through their openings 54, blowing over the surface of the liquid in each pan, and also meeting the shower of drops of liquid falling from one pan into the next below. While traversing the rectifying pans 53 in the manner described, the opposite moving streams of liquid and vapor interchange their nitrogen and oxygen in accordance with the well known law of Baly. Thus the falling liquid will contain in the top pan 21% oxygen, but in the bottom pan 48% oxygen. The rising vapor and exhaust will contain on passing the bottom pan 21% oxygen, and on passing through the top pan only 7% oxygen.

From the rectifying pans 53 the rising vapor and exhaust pass up between the thin annular tanks 51 of the purifier 42. These tanks 51, as already explained, are filled with liquid air fresh from the liquefier. As the liquid is released from the liquefier and flows into the purifier 42, a small amount of vapor will be given off by it. This vapor will contain about 7% oxygen, and will pass out of the purifier 42 along with the excess liquid, and will be released from the purifier in the space between the purifier 42 and the rectifying pans 53. At this point the vapor accompanying the liquid overflowing from the purifier 42, meets the rising stream of the exhaust, which at this point also contains about 7% oxygen, and mingling with it, passes up through the spaces between the annular tanks 51 of the purifier. But the purifier tanks are filled with liquid air at atmospheric pressure, and are therefore at the coldest temperature found anywhere in the apparatus. This temperature is below the liquefying temperature of oxygen. Therefore the rising stream of vapor and exhaust will lose its remaining 7% of oxygen in passing through the purifier, by the condensation of the same in the form of drops upon the cold walls of purifier tanks 51. These drops will of their own weight run down the walls of the purifier and join the descending stream of liquid in the top rectifying pan. The rising stream of vapor and exhaust will leave the purifier as practically pure nitrogen gas, at the same temperature as that of liquid air at atmospheric pressure, and will pass on to perform the work of liquefaction in the liquefier, and will then pass out of the apparatus through the exhaust channel of the interchanger.

In order to secure proper performance of the operations described above, it is necessary to have control of the temperature of the exhaust as it leaves the motor. This control is obtained by proper manipulation of the liquefier trap 31, and discharge valve 40. It will be readily understood that as the cold exhaust passes up through the liquefier causing liquid to be formed therein, the exhaust takes the heat from the air that is being liquefied, so that its own temperature is raised. Also, if the rate of liquefaction is slow, the rise in the temperature of the exhaust will be small and, conversely, if the rate of liquefaction is rapid, the rise in temperature of the exhaust will be large. Also, if the liquefying surface exposed to the effect of the cold exhaust is sufficiently large, the exhaust will leave the liquefier at nearly the same temperature as that of the compressed air entering it. But the throttle of the motor is connected to the liquefier at the point where the compressed air enters it, so that, if the temperature of the compressed air entering the liquefier is raised by increasing the rate of liquefaction, the temperature of the compressed air being supplied to the motor will be raised the same amount.

The rate of liquefaction can be controlled by controlling the level of the liquid in the liquefier and trap. Thus, if the liquid is maintained at a level near the top of the liquefier, the effective liquefying surface exposed to the action of the cold exhaust will be small, the rate of liquefaction will be slow, and the temperature of the compressed air supplied to the motor will be but little above that of the exhaust on leaving the motor. If the liquid level is held at a point near the bottom of the liquefier, the effective liquefying surface exposed to the action of the cold exhaust will be a maximum, the rate of liquefaction will be rapid, and the temperature of the compressed air supplied to the motor will be raised the maximum amount possible. If the surface of the liquefier is sufficiently large, the temperature of the air supplied to the motor may be raised practically to normal, under which condition the function of the interchanger will be entirely transferred to or absorbed by the liquefier. From the above it will be seen that by proper manipulation of the trap 31 and discharge valve 40, the temperature of the air supplied to the motor may be raised or lowered at will. If now the temperature of the air supplied to the motor is raised to a point such that the difference in temperature of the air entering and leaving the motor is as great as expansion in the motor can produce, then any further elevation in the temperature of the air supplied to the motor will result in a rise in temperature of the exhaust. Thus, the temperature of the exhaust can also be controlled by proper manipulation of the trap 31 and discharge valve 40. In this manner the temperature of the exhaust can be adjusted so as to produce the best mutual action between the rising stream of vapor and exhaust and the descending stream of liquid.

In further consideration of the operation of the liquefier and trap in coöperation with the motor, it must be borne in mind that the higher the temperature at which expansion in the motor begins, the greater the drop in temperature actually taking place therein. Combining this principle with what has already been explained, it will be seen that as the demands upon the liquefier are increased, the refrigerating power of the motor is increased. Also since a continuous stream of liquid is kept falling down through the apparatus in close association with the rising exhaust, the temperature of the exhaust will always be reduced to that of the liquid by the time it reaches the liquefier, provided the liquid is not all evaporated by the heat of the exhaust. But the liquid evaporated will replace itself by condensing a corresponding amount as its vapor passes through the liquefier, so that losses in the falling column of liquid are made up by increased liquefier condensation. Therefore, since the refrigerating power of the motor increases as the temperature of the air supplied to it is raised, the net amount of liquid produced will necessarily be increased by raising the temperature of the air supplied to the motor in the manner described above; that is, the total amount of liquid produced by the apparatus, as a whole, can be increased to a maximum by providing a large liquefying surface in the liquefier, operating the same with the liquid level therein as low as possible, and thereby sending the compressed air to the motor at approximately normal temperature.

Theory would indicate that with about 600 pounds pressure, and an efficient motor, over 30% of the air supplied to the apparatus can be drawn from it in the form of liquid. In actual operation, however, it is desirable to draw off only about 21% in the form of liquid, for, if more is drawn off, some nitrogen must be drawn off with it and the liquid will not be pure oxygen; also, if less than 21% is drawn off, some oxygen is being lost in the exhaust which cannot then be pure nitrogen. In actual operation the trap and liquefier are to be adjusted so that the apparatus will yield substantially 21% liquid with the minimum initial pressure, which will amount to the same thing as adjusting to give the maximum output of pure gases per unit of power used in operating the apparatus.

While I have described my invention as applied to the production of oxygen and nitrogen from the air and have explained its principles and what I now regard as the best mode of application thereof, it is obvious that it is well adapted for the separation of many other mixed gases, or, in part at least, for simply liquefying air or other gases, and that the several parts of the apparatus shown and described and the arrangement and combination thereof can be variously and widely modified, or equivalents substituted therefor, without departing from the spirit or sacrificing the advantages of the invention. Thus, by way of example, a turbine or any other form of expansion motor, or even a throttled nozzle, may be used in place of a reciprocating engine; the expander may be placed at the bottom instead of at the top of the apparatus, thus avoiding the necessity of carrying the exhaust therefrom down through the separator and saving some of the space taken up by the large exhaust pipe; and the interchanger may be constructed in many different forms and can, if for any reason desirable, be located apart from the rest of the apparatus. Such other modifications can also be made as fall within the scope of the appended claims.

I make no claim herein to the apparatus above set forth, since the same has been made the subject matter of a divisional application.

What I claim as new, and desire to secure by Letters Patent, is—

1. The art or process of separating a mixed gas like air which consists in effecting the separation thereof solely by interactions between a downward current of liquefied portions and an upward current of unliquefied portions of the gas.

2. The art or process of separating a mixed gas like air which comprises compressing the gas, liquefying portions and expanding other portions of the compressed gas, and then effecting the separation of both by rectifying and thermal interactions between the liquefied and expanded gas.

3. The art or process of separating a mixed gas like air by causing a warmer current of the expanded gas to pass up through a current of the gas which has been liquefied and is flowing downwardly in a stratified manner and causing the vaporous products of the separation to liquefy more gas under compression to maintain the downward current of liquefied gas.

4. The art or process of separating a mixed gas like air by compressing the gas, liquefying portions and expanding other portions of the compressed gas, releasing the liquefied gas from compression and effecting thermal and rectifying interactions between the liquefied gas and the expanded gas, and causing the vaporous products of the separation to liquefy further portions of the compressed gas to maintain a continuous downward current of liquefied gas.

5. The art or process of separating a mixed gas like air by causing a current of vaporous gas to pass up through a downwardly flowing current of liquefied gas and causing the resulting liquid products below and vapor products above to pass off in intimate thermal but not in physical contact with the said currents of vaporous gas and liquefied gas respectively.

6. The art or process of separating a mixed gas like air by passing a current of the gas which has been compressed and cooled by expansion up through a current of liquefied gas flowing downwardly in a stratified manner and causing the said cool expanded gas to first pass in intimate thermal but not in physical contact with the resulting liquid products and the said liquefied gas to first pass in intimate thermal but not in physical contact with the resulting vapor products.

7. The art or process of separating a mixed gas like air by causing a flow of the liquefied gas down and of warmer expanded gas up into a rectifier and supplementing the rectifying action therein by causing the unrectified gas supplied to one end of the rectifier to first pass in counter-current in thermal but not physical contact with the rectified gas discharged from the same end of the rectifier.

8. The art or process of separating a mixed gas like air by causing a flow of liquid gas down and of warmer gas up through a rectifier, supplementing the rectifying action therein by causing the liquid products of the rectification to pass downward in thermal but not physical contact with the warmer gas about to enter the rectifier.

9. The art or process of separating a mixed gas like air by causing a flow of liquid gas down and of warmer gas up through a rectifier, supplementing the rectifying action therein by causing the liquid products of the rectification to pass downward in thermal but not physical contact with the warmer gas about to enter the rectifier and also causing the vapor products of the rectification to pass upward in thermal but not physical contact with the liquid gas about to enter the rectifier.

10. The art or process of separating a mixed gas like air by creating a continuous current of compressed gas, liquefying the gas while under compression, releasing the liquefied gas from compression and causing it to so interact with a current of warmer expanded gas as to separate both into their component parts, and utilizing the refrigerative effect of the vapor products of the separation to liquefy the gas under compression.

11. The art or process of separating a mixed gas like air by causing cold expanded gas to first liquefy sufficient compressed gas to provide an initial or preliminary charge of liquid gas and then, in interaction with the said preliminary charge and with gas subsequently liquefied under compression by the vapor products of the separation and released from pressure, to separate both the liquefied and the exhaust gas into its component parts.

12. The art or process of separating a mixed gas like air by expanding cold compressed gas and causing the colder expanded gas to first liquefy a sufficient quantity of compressed gas and then, in interaction with the gas so liquefied and with a current of gas subsequently liquefied under compression by the vapor products of the separation and released to substantially atmospheric pressure, to separate both the liquid and the expanded gas into its component parts, and, after the operation is under way, raising the temperature of the compressed gas which is being expanded.

13. The art or process of separating a mixed gas like air by compressing the gas and causing it to pass in a continuous current in part through an expander and in part through a liquefier, causing the cold exhaust air from the expander and the liquefied gas discharged from the liquefier and reduced to substantially atmospheric pressure to interact to separate both the liquid and the exhaust gas with their component parts, and causing the vapor products of the separation to first liquefy the compressed gas passing through the liquefier and then cool the compressed gas supplied both to the liquefier and expander.

14. The art or process of separating a mixed gas like air by compressing the gas and passing it in a continuous current in part through an expander and in part through a liquefier, causing the cold exhaust gas from the expander and the liquefied gas discharged from the liquefier at substantially atmospheric pressure to interact to separate both into their component parts, utilizing the vapor products of the separation to first liquefy the compressed gas passing through the liquefier and then cool the compressed gas supplied to the liquefier and the expander, and controlling the temperature of the compressed gas supplied to the expander through control of the amount of the compressed gas in the liquefier which is exposed to the refrigerator effect of the vapor products of separation.

15. The art or processes of liquefying a gas by exposing cold compressed gas to the refrigerative effect of colder expanded gas and varying the surface of the compressed gas so exposed to control the rate of liquefaction.

16. The art or process of liquefying a gas by exposing a variable surface of cold compressed gas to the refrigerative effect of colder expanded gas and thereby regulating the rate of liquefaction and the temperature of the compressed gas to be expanded.

17. The art or process of liquefying a gas by causing a flow of cold expanded gas over or around gas under compression and so connecting the compressed gas to be liquefied with the compressed gas to be expanded that the regulation of the surface of the compressed gas exposed to the refrigerative effect will automatically regulate the temperature of the compressed gas to be expanded.

18. The art or process of liquefying a gas by causing expanded gas to vaporize liquefied gas, and then utilizing the refrigerative effect of the vapor thus produced to liquefy gas under compression.

19. The art or process of liquefying a gas by using the heat of expanded gas to vaporize liquid gas and then using the refrigerative effect to liquefy gas under compression.

20. The art or process of liquefying a gas by causing expanded gas to vaporize liquefied gas and the vapor thus produced to liquefy gas under compression and exposing varying surfaces of the compressed gas to the said refrigerative effect to regulate the temperature of the expanded gas.

21. The art or process of liquefying a gas by compressing the gas and causing it to flow in a continuous current in part through an expander and in part through a liquefier, causing the cold exhaust gas from the expander to pass up into and vaporize liquefied gas discharged from the liquefier at a reduced pressure, and causing the vapor products thus produced to liquefy the compressed gas passing through the liquefier.

22. The art or process of liquefying a gas by compressing the gas and causing it to flow in part through an expander and in part through a liquefier, using the heat of the exhaust gas from the expander to vaporize liquid gas from the liquefier and the cold vapor thus produced to liquefy the compressed gas passing through the liquefier, and varying the surface of the compressed gas exposed in the liquefier to the refrigerative action of the said vapor to regulate the temperature of the compressed gas passing to the expander.

23. The art or process of liquefying air by compressing the air and causing it to pass in a continuous current in part through an expander and in part through a liquefier, causing the cold exhaust air to flow upward into the liquid air discharged from the liquefier and flowing downwardly at substantially atmospheric pressure, causing the vapor thus produced to first liquefy the compressed air passing through the liquefier and then to cool the compressed air passing to the liquefier and expander, and regulating and controlling both the temperature of the compressed air pouring into the expander and the rate of liquefaction by varying the surface of the compressed air which is exposed in the liquefier to the refrigerative action of the said vapor.

In witness whereof, I have signed my name in the presence of two witnesses.

EDSON F. GALLAUDET.

Witnesses:
 WM. B. WHITNEY,
 H. K. GRANDIN.